United States Patent
Shipman, Jr. et al.

(10) Patent No.: US 10,404,846 B1
(45) Date of Patent: Sep. 3, 2019

(54) COMMUNICATION SYSTEM

(71) Applicant: Tech Friends, Inc., Jonesboro, AR (US)

(72) Inventors: Bobby L. Shipman, Jr., Jonesboro, AR (US); Bryan Taylor, Bono, AR (US); Jason Cochran, Jonesboro, AR (US)

(73) Assignee: TECH FRIENDS, INC., Jonesboro, AR (US)

( * ) Notice: Subject to any disclaimer, the term of this patent is extended or adjusted under 35 U.S.C. 154(b) by 0 days.

(21) Appl. No.: 15/897,004

(22) Filed: Feb. 14, 2018

(51) Int. Cl.
*H04M 1/725* (2006.01)
*H04M 1/02* (2006.01)
*H04M 1/03* (2006.01)

(52) U.S. Cl.
CPC ..... *H04M 1/72527* (2013.01); *H04M 1/0256* (2013.01); *H04M 1/0274* (2013.01); *H04M 1/03* (2013.01)

(58) Field of Classification Search
CPC ...... H04M 11/00; H04M 11/025; H04M 1/02; H04M 1/0254; H04M 1/026; H04M 1/0297; H04B 1/38; H04B 1/3827
See application file for complete search history.

(56) References Cited

U.S. PATENT DOCUMENTS

| | | | |
|---|---|---|---|
| 9,026,710 B2 * | 5/2015 | Goodman | G06F 1/1632 710/100 |
| 9,167,064 B2 * | 10/2015 | Elter | H04M 1/72 |
| 9,245,441 B1 * | 1/2016 | Poojary | G08C 17/02 |
| 9,319,109 B2 * | 4/2016 | Jurgovan | H04B 5/0037 |
| 9,832,596 B2 * | 11/2017 | Huang | H04L 67/16 |
| 9,942,379 B2 * | 4/2018 | Huang | H04M 1/7253 |
| 2009/0209293 A1 * | 8/2009 | Louch | H04M 1/6041 455/566 |
| 2010/0202627 A1 * | 8/2010 | Gray | H01M 10/465 381/77 |
| 2012/0321057 A1 * | 12/2012 | Goodman | H04M 1/2472 379/90.01 |
| 2013/0210494 A1 * | 8/2013 | Jouin | H04M 1/72525 455/566 |
| 2014/0274200 A1 * | 9/2014 | Olson | H04B 1/3877 455/552.1 |
| 2017/0163788 A1 * | 6/2017 | Andersen | G06F 1/1632 |
| 2018/0069964 A1 * | 3/2018 | Koreis | H04M 7/009 |

* cited by examiner

*Primary Examiner* — Blane J Jackson
(74) *Attorney, Agent, or Firm* — Schrantz Law Firm, PLLC; Stephen D. Schrantz (57) ABSTRACT

A communication system for a mobile computing device that provides for personal communication. A housing of the communication system provides a receiving aperture for accepting the mobile computing device. An upper wall and lower wall of the housing guide the mobile computing device into the housing towards an interior wall. An audio data transmission system enables communication between the mobile computing device with the audio input and the audio output. Insertion of the mobile computing device into the housing connects the mobile computing device with the communication system. Upon connection with the communication system, the mobile computing device outputs audio to the external audio output. The mobile computing device also receives audio captured by the audio input.

18 Claims, 10 Drawing Sheets

COMMUNICATION SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

I. Field of the Invention

The present invention relates to a communication system that provides an auditory communication system for allowing private conversation through a mobile computing device, such as a tablet, a phone, a smart phone, a laptop, or other computing device. While mobile computing devices may provide an internal speaker and internal microphone, the internal speaker and microphone of the mobile computing device do not allow private conversation. Instead, the internal speaker and microphone broadcast the conversation to the outside world. The mobile computing device does not provide the private conversation allowed by a telephone.

A separate device is required to allow for private conversation with a mobile computing device. A separate headset with microphone and speaker are required to provide a private conversation. Such a separate headset is a usable commodity that is an expense for the controlled environment. Each individual resident of the controlled environment facility would require the individual headsets. The headsets could be lost, misplaced, confiscated, or otherwise rendered not usable by the resident. The resident would then require another headset for private conversation on the mobile computing device. Each additional headset would be an extra expense for the controlled environment facility or the resident.

The present invention provides a device and system for private conversation that enables usage by more than one resident. The present invention provides for a single housing that can be reused by the individual residents.

The present invention replaces the traditional headsets that plug into the mobile computing device. Instead, the user inserts the mobile computing device into the housing to enable a private conversation. Insertion of the mobile computing device into the housing connects the mobile computing device with an audio data transmission system. Insertion of the mobile computing device within the housing activates the audio data transmission system. The mobile computing device then receives the audio captured by the audio input. The mobile computing device transmits audio to be played to the external audio output.

In one embodiment, a plug located within the housing serves as the audio data transmission system. The mobile computing device plugs into a plug connected to a conductor, such as a coaxial cable or other audio cable, attached to an audio output device and an audio input device. The audio input device and the audio output device enable private conversation through the mobile computing device.

In another embodiment, the audio data transmission system may be a wireless system, including but not limited to a transmitter, receiver, and/or transceiver. The mobile computing device wirelessly transmits and wirelessly receives the audio data between the mobile computing device and the audio input and the audio output. Such a wireless system may not require a plug inserted into the port. In such an embodiment, insertion of the mobile computing device into the housing connects the mobile computing device to the communication system.

The present invention removes the need for a resident to maintain and keep control of a functioning headset. The present invention also replaces the need for residents and the controlled environment facility to purchase individual headsets for each resident. A single housing of the present invention can accommodate multiple residents without requiring purchases of individual headsets and replacement headsets.

In one embodiment, the communication system tracks the location of the mobile computing device and the user. The housing is located within a known area within the controlled environment. Because a user will be assigned an identified mobile computing device, the communication system can determine which user has connected to the communication system. The system knows the user assigned to the mobile computing device and the location of the housing. The system can then track the location of the user via insertion of the mobile computing device within the housing.

II. Description of the Known Art

Certain problems exist with the known art. The controlled environment facility may be required to provide a resident with a method of communicating with others outside of the facility. The known headsets require each resident to maintain a properly functioning headset.

The resident or the controlled environment facility would be required to purchase a headset for each resident. These headsets may break, be lost, confiscated, rendered not usable for the resident, or otherwise fail. The resident or the controlled environment facility would then be required to purchase a replacement headset. These headsets require an ongoing expense for continued usage.

Therefore, the present invention is needed to provide a unique communication system that increases safety and reduces costs.

SUMMARY OF THE INVENTION

The present invention relates to a communication system for a personal computing device that provides for personal communication. Such personal computing devices include but are not limited to a tablet, a phone, or a smart phone. A housing of the communication system provides a receiving aperture for accepting the mobile computing device. The user inserts the mobile computing device into the housing.

An upper wall and lower wall of the housing guide the mobile computing device into the housing towards an interior wall.

A plug protrudes from the interior wall. The housing aligns a port of the mobile computing device with the plug within the receiving aperture of the housing. The plug of one embodiment is a combination plug for both an audio input and at least one audio output. Such plugs include but are not limited to an audio plug, a USB plug, a Lightning plug, or other plug that inserts into the port. The ports include but are not limited to an audio port, a charging port, a USB port, a micro-USB port, a lightning port, or other port capable of transmitting audio.

The plug secures to a conductor such as a coaxial cable, audio cable, or other cable capable of transmitting audio. The conductor conducts the audio signal between the mobile computing device, the audio output, and the audio input. The conductor transfers the audio signal from the audio input to the mobile computing device. The conductor also transfers the audio signal from the mobile computing device to the audio output. The conductor includes but is not limited USB cable or other digital data cable. In another embodiment, the mobile computing device communicates wirelessly through wireless transmissions. Such wireless transmissions may include but not limited to Blue Tooth communication.

In one embodiment, the audio input is a microphone or other audio capturing device. The audio input may be an earbud, a headset, a microphone, or other audio capturing device that will capture audio and transmit the audio to the mobile computing device.

The audio output of one embodiment is at least one speaker or a set of speakers. The audio output may be a pair of headphones, a headset, earbuds, a personal speaker, or other speakers.

The audio input and audio output may be implemented in a single device. Such devices providing both audio input and audio output includes a handset, phone receiver, a pair of headphones, a headset, and earbuds.

The housing of one embodiment secures the mobile computing device within the housing. The walls and guide fingers of the housing guide the mobile computing device into the housing. The walls and guide fingers also align the port of the mobile computing device towards the plug. The plug inserts into the port of the mobile computing device.

The conductor and the plug within the housing transmits the signals between the audio input and the mobile computing device. The conductor and the plug within the housing also transmits the signals between the audio output and the mobile computing device. The conductor within the housing runs to the audio input and the audio output. The conductor sends the electric signal between the audio input, the audio output, and the mobile computing device.

It is an object of the present invention to provide a system for private communication in a controlled environment.

It is another object of the present invention to reduce the use of individual components required for each person using the system.

It is another object of the present invention to provide a community-based solution for private communication.

It is another object of the present invention to reduce costs associated with providing each user a set of headphones with microphone.

It is another object of the present invention to reduce the number of items to maintain at the controlled environment facility.

It is another object of the present invention to align the port of the mobile computing device with the plug to allow for the communication.

It is another object of the present invention to protect the communication within a housing.

These and other objects and advantages of the present invention, along with features of novelty appurtenant thereto, will appear or become apparent by reviewing the following detailed description of the invention.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
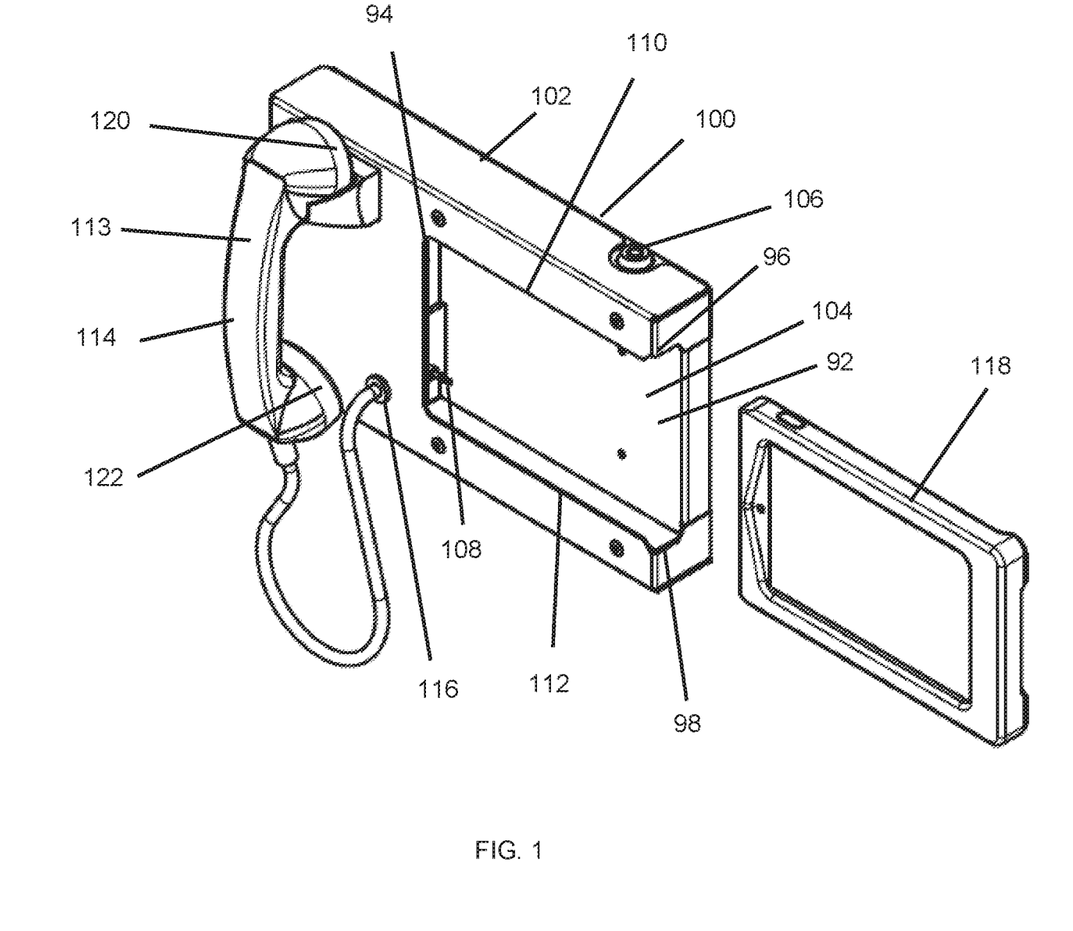
FIG. 1 is an environmental view of one embodiment of the present invention.

FIG. 1 shows the communication system 100 for a mobile computing device 118, such as tablet, that provides for personal communication. The mobile computing device 118 includes but is not limited to, a tablet, a phone, a smart phone, a laptop, or other computing device. A housing 102 of the communication system 100 provides a receiving aperture 104 for accepting the mobile computing device 118. The user inserts the mobile computing device 118 into the housing 102. An upper wall 96, lower wall 98, and recessed front wall 92 of the housing 102 guide the mobile computing device 118 into the housing 118 towards an interior wall 94.

The upper wall 96, lower wall 98, recessed front wall 92, and inner wall 94 define the receiving aperture 104. The upper wall 96, lower wall 98, recessed wall 92, and the inner wall 94 direct the mobile computing device 118 towards the plug 108.

Guide fingers 110, 112 maintain the mobile computing device 118 within the receiving aperture 104. Upper guide finger 110 extends below upper wall 96. Lower guide finger 112 extends above lower wall 98. The guide fingers 110, 112 are located laterally from the recessed front wall 92. The receiving aperture 104 separates the guide fingers 110, 112 from the recessed front wall 92.

The guide fingers 110, 112 maintain the mobile computing device 118 within the housing 102. The guide fingers extend at least partially across the front surface of the mobile computing device 118. The guide fingers 110, 112 limit forward movement of the mobile computing device 118 from the housing.

The receiving aperture 104 provides sufficient depth to secure the mobile computing device 118 within the housing 102. The mobile computing device inserts into the receiving aperture 104 along the longitudinal axis. The longitudinal depth of the receiving aperture 104 maintains the mobile computing device 118 within the receiving aperture 104 to limit the possibility that the mobile computing device falls out the side of the receiving aperture 104.

The user inserts the mobile computing device 118 into the housing 102 to enable a private conversation. Insertion of the mobile computing device 118 into the housing 102 connects the mobile computing device 118 with an audio data transmission system 113. Insertion of the mobile computing device 118 within the housing 102 activates the audio data transmission system 113. The mobile computing device 102 then receives the audio captured by the audio input 122. The mobile computing device 118 transmits audio to be played to the external audio output 120.

In one embodiment, a plug located within the housing serves as the audio data transmission system 113. The mobile computing device 118 plugs into a plug connected to a conductor, such as a coaxial cable or other audio cable, attached to an audio output device and an audio input device. The audio input device and the audio output device enable private conversation through the mobile computing device.

In another embodiment, the audio data transmission system 113 may be a wireless system. The mobile computing device 118 wirelessly transmits and wirelessly receives the audio data between the mobile computing device 118 and the audio input 122 and the audio output 120. Such a wireless system may not require a plug inserted into the port.

A plug 108 protrudes from the interior wall 94. The housing 102 aligns a port of the mobile computing device 118 with the plug 108 within the receiving aperture 104 of the housing 102. The plug 108 of one embodiment is a combination plug for both an audio input and at least one audio output.

Such plugs 108 include but are not limited to an audio plug, a USB plug, a Lightning plug, or other plug that inserts into the port. The ports include but are not limited to an audio port, a charging port, a USB port, a micro-USB port, a lightning port, or other port capable of transmitting and receiving audio.

The plug 108 secures to a conductor 116 that conducts a signal, such as an audio signal, an electronic signal, or other signal capable of transferring audio, between the mobile computing device 118, the audio output 120, and the audio input 122. The conductor 116 enables the audio signal to travel from the audio input 122 to the mobile computing device 118. The conductor 116 also allows the audio signal to travel from the mobile computing device to the audio output 120. The conductor 116 includes but is not limited to an audio cable, USB cable or other digital data cable.

In one embodiment, the audio input 122 is a microphone or other audio capturing device. The audio input 122 may be an earbud, a headset, a microphone, or other audio capturing device that will capture audio and transmit the audio to the mobile computing device.

The audio output 120 of one embodiment is at least one speaker or a set of speakers. The audio output 120 may be a pair of headphones, a headset, earbuds, a personal speaker, or other speakers.

The audio input 122 and audio output 120 may be implemented in a single device. Such devices providing both audio input and audio output includes a handset 114, a pair of headphones, a headset, and earbuds.

The housing 102 of one embodiment secures the mobile computing device 118 within the housing 102. The walls 92, 94, 96, 98 and guide fingers 110, 112 of the housing 102 guide the mobile computing device 118 into the housing 102. The walls 92, 94, 96, 98 and guide fingers 110, 112 also align the port of the mobile computing device 118 with the plug 108. The plug 108 inserts into the port of the mobile computing device 118.

The conductor 116 and the plug 108 within the housing 102 transmit the signals between the audio input 122 and the mobile computing device. The conductor 116 and the plug 108 within the housing 102 transmit the signals between the audio output 120 and the mobile computing device. The conductor 116 within the housing 102 runs to the audio input 122 and the audio output 120 of handset 114. The conductor 116 sends the electric signal between the audio input 122, the audio output 120, and the mobile computing device 118.

Figure 2:
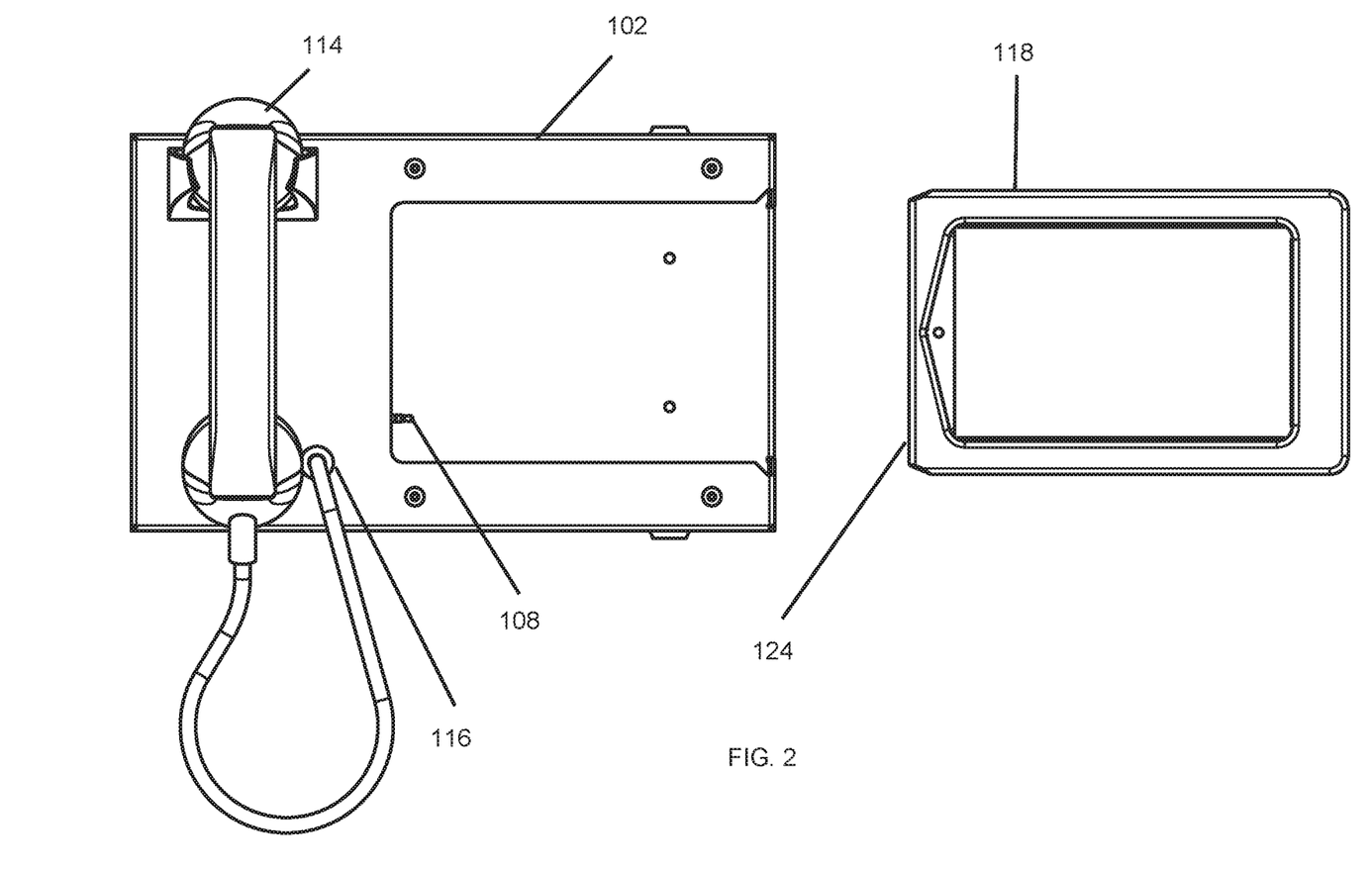
FIG. 2 is a front environmental view thereof.

FIG. 2 shows a front view of the communication system 100. Mobile computing device 118 inserts into the receiving aperture 104 of the housing 102. The housing 102 aligns the port 124 with plug 108. Inserting plug 108 into port 124 of mobile computing device 118 activates communication of the mobile computing device with the audio input and the audio output of handset 114. The conductor 116 transfers the signals between the mobile computing device 118 and the audio input and audio output of handset 114. The ports include but are not limited to an audio port, a charging port, a USB port, a micro-USB port, a lightning port, or other port capable of transmitting audio.

Figure 3:
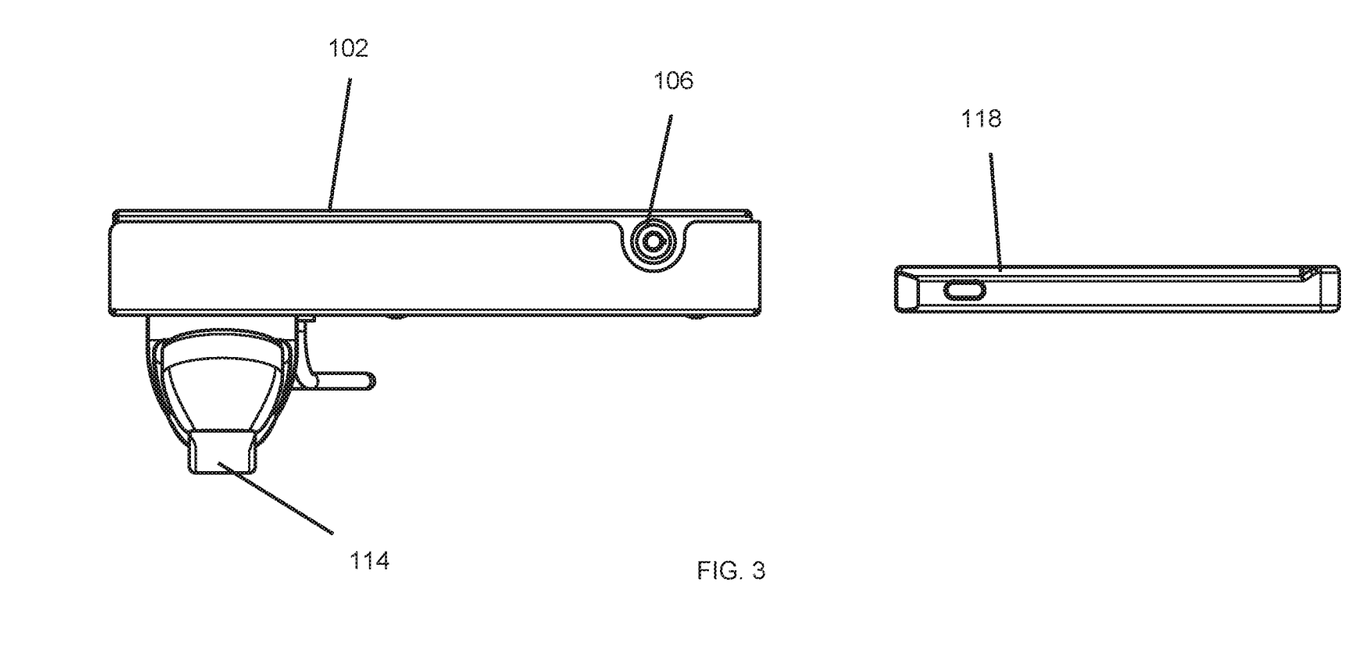
FIG. 3 is a top environmental view thereof.

FIG. 3 shows the lock 106 that secures the housing 102 and handset 114 to a wall of the controlled environment facility. The lock 106 limits access of the residents to the internal components within the housing 102. The lock 106 is placed within housing 102 to enable insertion of mobile computing device 118 within housing 102.

Figure 4:
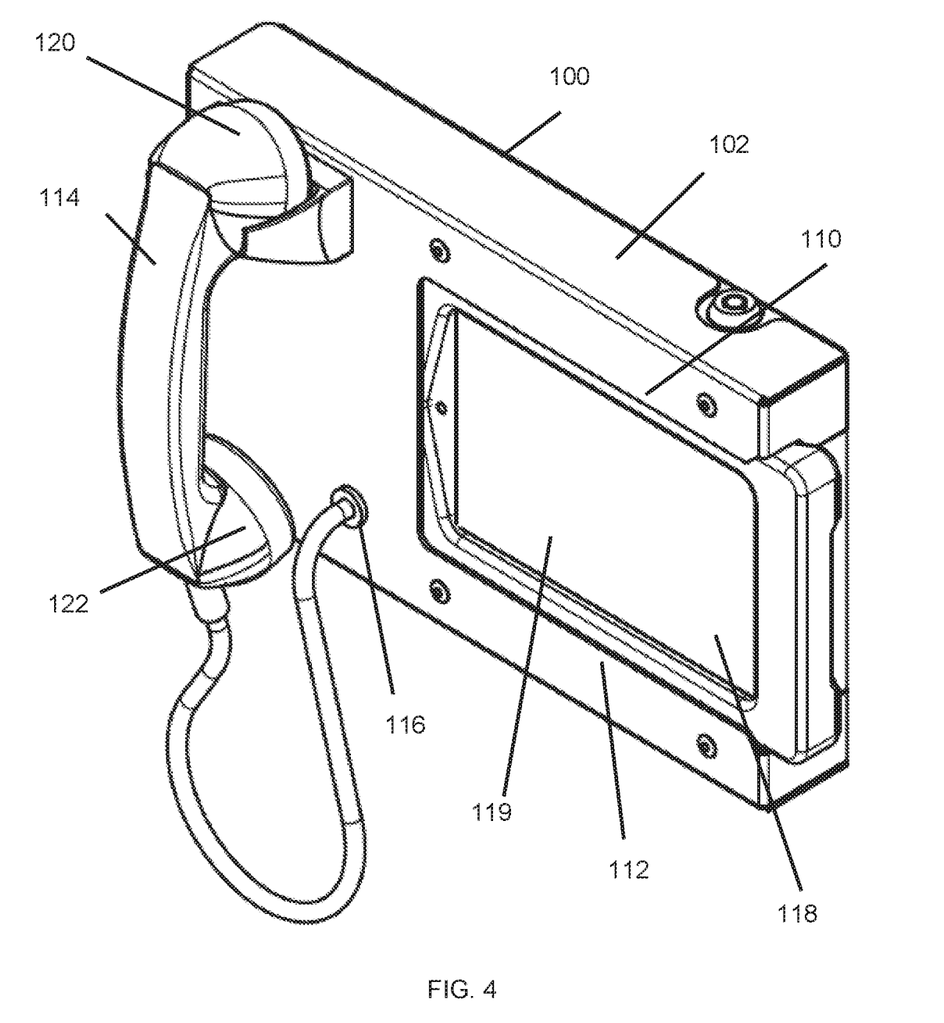
FIG. 4 is an environmental view thereof.

FIG. 4 shows the mobile computing device 118 within housing 102. Plug inserts into the port of the mobile computing device 118. The conductor 116 transfers the electrical signals between the audio output 120 and the audio input 122 within the mobile computing device 118. Upper guide finger 110 and lower guide finger 112 extend across the face 119 of mobile computing device 118. The upper guide finger 110 and lower guide finger 112 secure the mobile computing device 118 within the housing 102.

Figure 5:
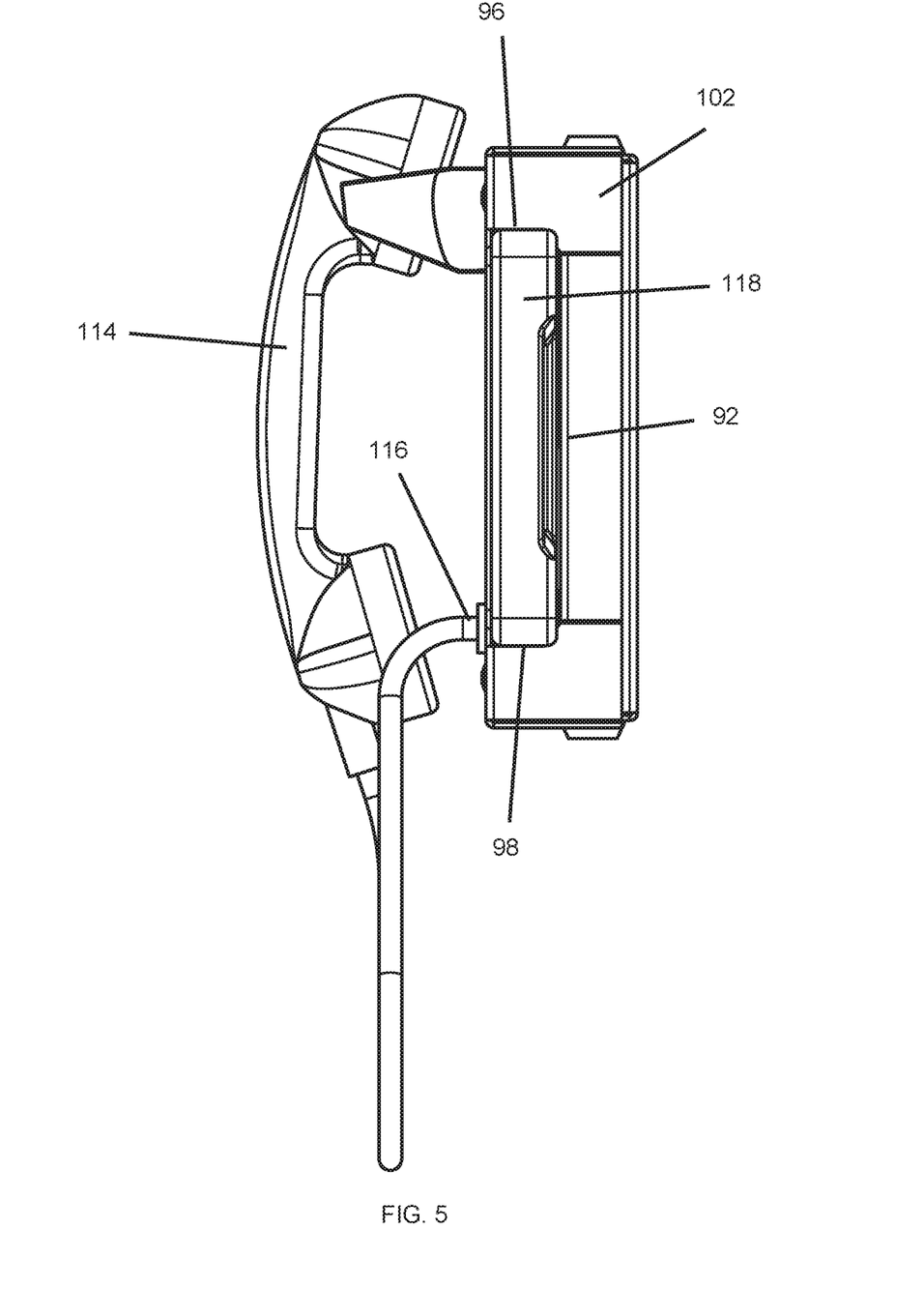
FIG. 5 is a right side view thereof.

FIG. 5 shows a side view of the mobile computing device 118 inserted within housing 102. The walls 92, 96, 98 guide the mobile computing device 118 within the receiving aperture of housing 102. The walls 92, 96, 98 also guide the port of the mobile computing device 118 to the plug within housing 102. The handset 114 secured to conductor 116 communicates with the mobile computing device. The housing 102 holds the receiver 114 for storage upon the housing.

Figure 6:
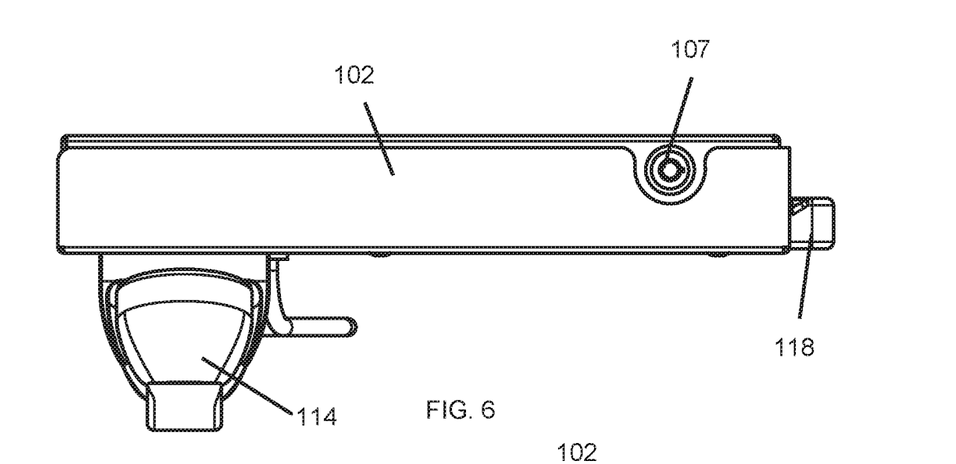
FIG. 6 is a top view thereof.

FIG. 6 shows a top view of the mobile computing device 118 inserted into the housing 102. The lock 107 secures the housing 102 to the walls of the facility as discussed above. The lock 107 secures the components of the communication system within the housing 102.

The housing remains secure to avoid usage of external power cables. Such an embodiment enables the housing to be installed at any location without requiring a power source. In other embodiments using wireless communication, an internal power source such as a battery may be installed within the housing. In some embodiments, a charging system is coupled to the housing to enable charging of the mobile computing device when fully inserted into the housing.

Eliminating the need for external power cables provides a safety feature for the correctional facility. The lack of external power cables simplifies the installation process. The lack of external power cables also eliminates an inmate's ability to weaponize or otherwise use the external power cables towards ill deeds.

Figure 7:
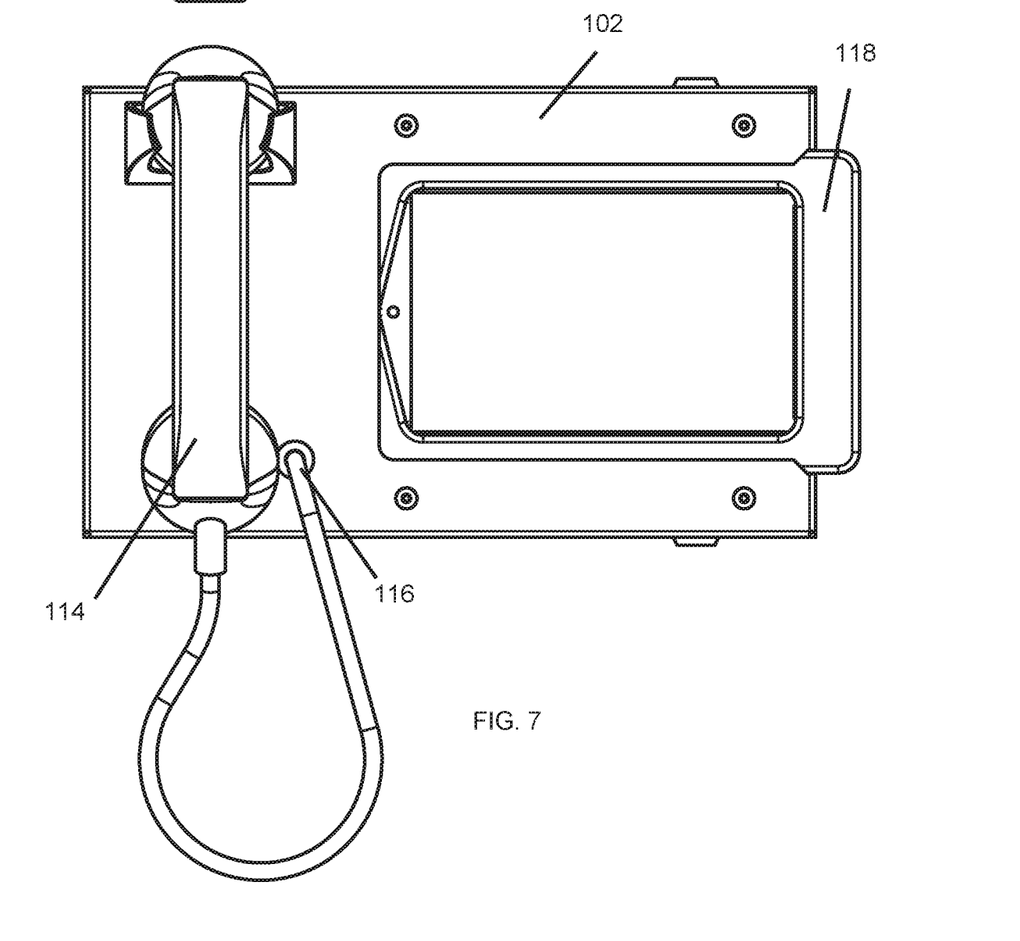
FIG. 7 is a front view thereof.

FIG. 7 shows the mobile computing device 118 inserted into the housing 102. The plug is inserted into the port. The conduit 118 transmit the signals to the handset 114.

Figure 8:
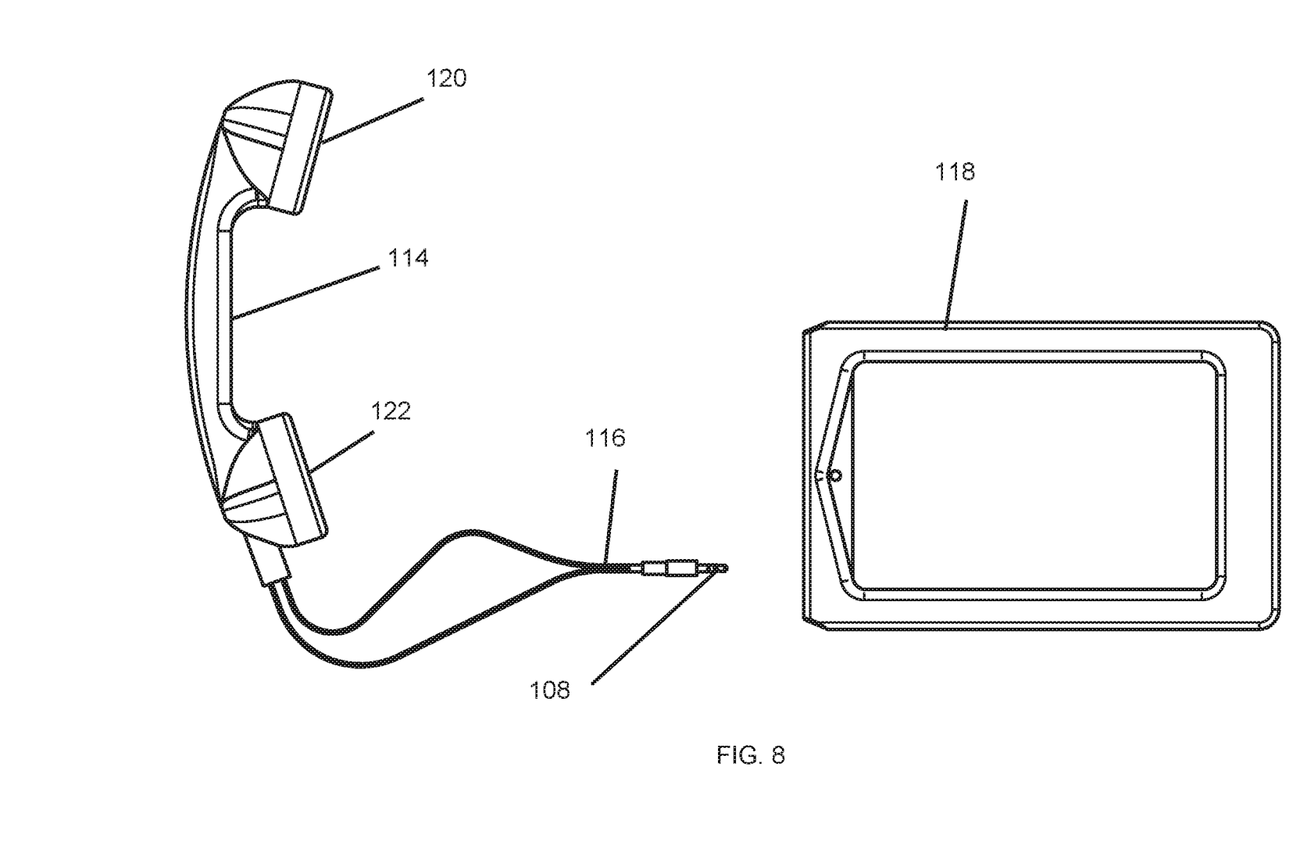
FIG. 8 is an environmental view thereof.
Figure 9:
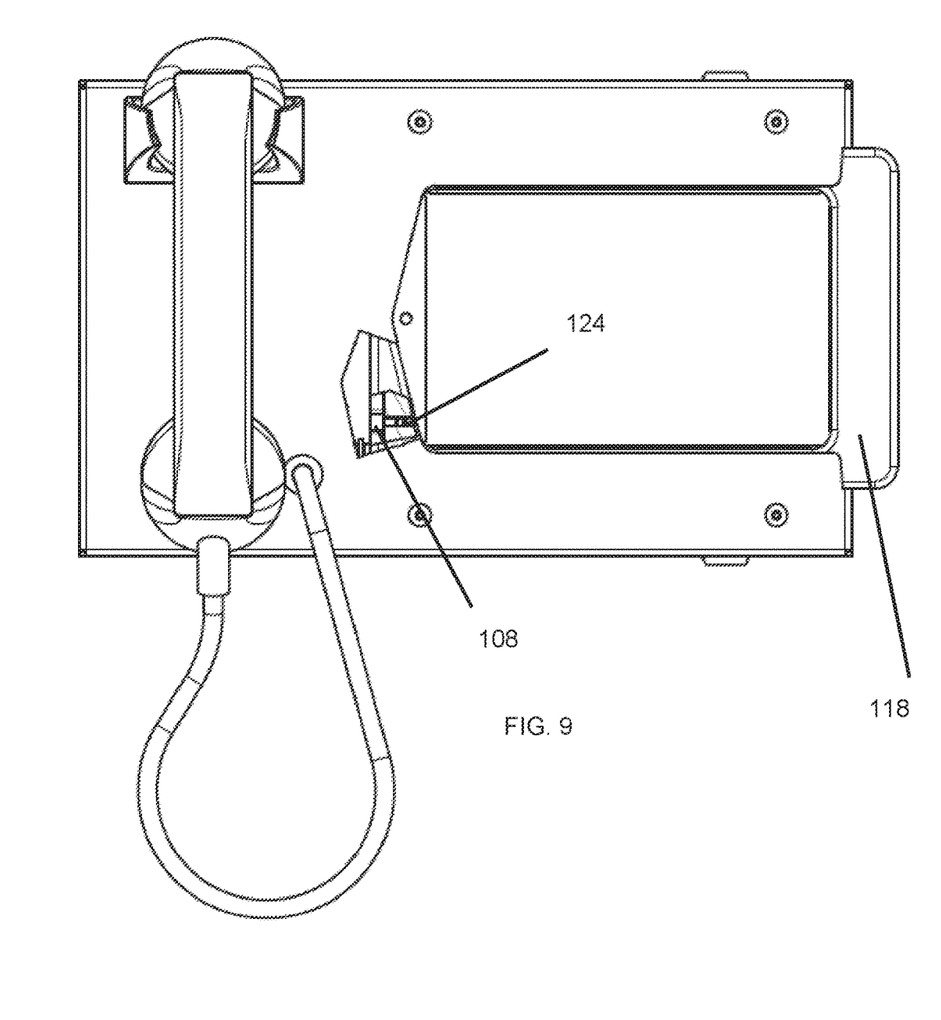
FIG. 9 is a sectional view of one embodiment of the present invention.

FIGS. 8 and 9 show the handset 114 and the audio input 122 and the audio output 120. The conductor 116 and plug 108 have been removed from the housing to provide additional detail concerning the conductor 116. The conductor 116 connects the plug to both the audio input 122 and the audio output 120 of the handset 114. The plug 108 inserts into the port 124 of the mobile computing device 118.

The housing of one embodiment has been shown and described as having a wired connection with conductor 116. The communication of one embodiment provides for a wireless connection between the mobile computing device and the audio input and audio output. The audio input 122 and audio output 120 communicate wirelessly with the mobile computing device in such an embodiment. Such wireless connection may be accomplished with WIFI, Bluetooth, or other wireless communication.

In such a wireless embodiment, the plug may not be present within the housing. The wireless connection transmits the audio between the mobile computing device and the audio input and the audio output. In such an embodiment, the audio input and audio output may be secured to the housing to eliminate loss, destruction, or otherwise incapacitating the audio input and audio output. Securing the audio input and the audio output to the housing limits removal of the audio input and the audio output. Such attachment of the audio input and the audio output also limits loss, theft, destruction, or other incapacitation of the audio input and the audio output.

Because additional mobile computing devices may be in use at the correctional facility, insertion of the mobile computing device into the housing activates the connection of the mobile computing device with the audio input and the audio output. The communication system detects that the mobile computing device is present within the housing. Detection of the mobile computing device within the housing connects the mobile computing device to the audio input and the audio output.

The communication system detects the mobile computing device within the housing. Such detection can occur through insertion of the plug into the port. In the embodiments that do not provide a plug, the communication implements other methods of detecting the mobile computing device.

Such detection methods include location-based detection. The communication system detects placement of the mobile computing device in an identified location. Such detection activates the wireless connection with the audio input and the audio output.

Such detection methods include but are not limited to GPS location. The communication system may detect the GPS coordinates of the mobile computing device. The GPS coordinates of the mobile computing device may instruct the system that the mobile computing device is installed within the housing for usage with the audio input and the audio output. To provide additional confirmation that the mobile computing device is installed within the housing, the communication system may determine the orientation of the mobile computing device with a gyroscope or other device to determine the status of the mobile computing device.

The system could also determine the location of the mobile computing device by requiring a picture of a location identifier. Such a location identifier may be a bar code or other image recognizable by the communication system. Recognition of the location identifier confirms that the mobile computing device is installed within the housing.

In another embodiment, the communication system may emit a connect signal detected by the mobile computing device. Such a connect signal may include but is not limited to an ultrasonic signal, data, or other information received by the mobile computing device. The mobile computing connects to the audio input and the audio output upon detection of the connect signal.

In one embodiment of the present invention, features of the computing device are limited until the mobile computing device connects to the communication system. Such features include but are not limited to enabling phone call capabilities, enabling video conferencing capabilities, enabling the camera for pictures, enabling the camera for video, transmission of audio captured by the external audio input to the mobile computing device, and transmission of audio from the mobile computing device to the external audio output.

In one embodiment, the correctional facility may limit functionality of the mobile computing device. The correctional facility may limit phone call capabilities, video conferencing capabilities, functioning of the camera, and functioning of the microphone. The correctional facility may only allow such functions in certain areas of the facility. In such an embodiment, the mobile computing device cannot perform particular functions, including, but not limited to, phone calls, video conferencing, use of the camera for either pictures or movies, and the microphone until authorized. Such authorization occurs through connection to the communication system or insertion of the mobile computing device into the housing.

Insertion of the mobile computing device activates such features. In another embodiment, connecting the mobile computing device to the communication system activates such features. Upon insertion of the mobile computing device into the housing or connecting the mobile computing device to the communication system, the mobile computing device presents the user with options. Such options include phone calls, video conferences, use of the camera, and use of the microphone. In another embodiment, the mobile computing device activates phone call capabilities, video conferencing capabilities, functioning of the camera, and functioning of the microphone upon insertion of the mobile computing device into the housing and/or connecting the mobile computing device to the communication system.

The present invention also tracks location of the tablet and the users of the mobile computing device with the communication system 100. Placement of the mobile computing device 118 within the housing 102 activates a tracking system that tracks the location of the mobile computing device 118. Connecting the mobile computing device 118 to the communication system confirms the location of the mobile computing device 118. The communication system also tracks the user that is currently using the mobile computing device.

In one embodiment, the user is an inmate of the controlled environment, such as a correctional facility. The facility may require the inmate to check out a specific mobile computing device. The facility assigns the mobile computing device to an inmate. The system associates the inmate with the mobile computing device. The system may then track the inmate by determining the location of the mobile computing device.

The housing of the communication system is located at a known location. Connecting the mobile computing device to the communication system alerts the system that the mobile computing device is located in or near the housing. Knowing the location of the mobile communication system, the communication system tracks the location of the mobile computing device connected to the communication system. The communication system tracks both the location of the mobile computing device and the user associated with the mobile computing device.

The communication system tracks the users associated with the mobile computing device connected to the communication system. Residents, such as inmates, may be assigned to the mobile computing device. Officers of the correctional facility may also be assigned to the mobile computing device. The communication system tracks those users, such as the inmates and/or the officers, assigned to the mobile computing device. Such a communication system provides for an officer tracking system. The communication system also provides for an inmate tracking system.

Figure 10:
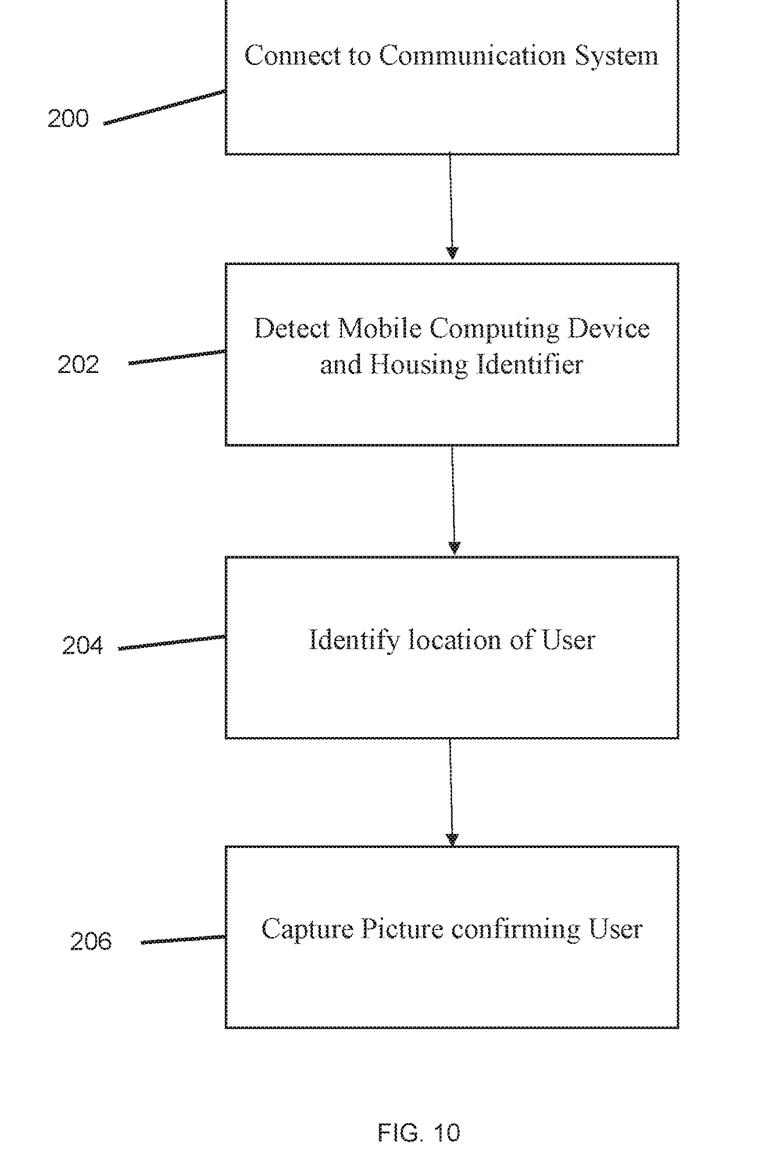
FIG. 10 is a flowchart showing a tracking process of one embodiment of the present invention.

FIG. 10 shows the tracking functionality of the communication system. The mobile computing device connects to the communication system as shown at Step 200. The communication system detects the mobile computing device and the housing to which the mobile computing device connects at Step 202.

In one embodiment of the present invention, the communication system provides at least two or more housings installed within a controlled environment. The mobile computing device connects to a housing of the communication system for communication with other people.

Insertion of the mobile computing device into the housing designates a location of the mobile computing device. The communication system identifies the mobile computing device and the housing to which it is inserted. In one embodiment, each housing is associated with a housing identifier and a location. The communication system identifies the mobile computing device and the housing to which it connects. The communication system locates the user by associating the detected mobile computing device with the location of the housing at Step 204.

The communication system of one embodiment stores the location data of the users and the mobile computing device. The communication system may also store the time of detecting the mobile computing device and the user assigned to the mobile computing device. The mobile computing device of one embodiment records the date and time that the mobile computing device is inserted into housing. In another embodiment, the mobile computing device records the date and time it connects to a communication system. In one embodiment the mobile computing device also records a housing identifier of the housing in which the mobile computing device is connected or inserted.

In another embodiment, a computer or other server records the date and time that each mobile computing device is inserted into a housing. In another embodiment, the computer or other server records the date and time each mobile computing device connects to a communication system. In one embodiment, the computer or server also records a housing identifier of the housing in which the mobile computing device is connected or inserted.

The communication system may also generate a report. The report identifies which mobile computing devices are inserted into the housing or housings. The report may also identify the date and time that the mobile computing device is inserted into the housing. The report may also identify the location of the mobile computing device at the date and time. The report may also identify the housing in which the mobile computing device is inserted/connected to at the time.

These reports may be displayed on the mobile computing device. These reports may also be displayed on other computers.

In one embodiment, the mobile computing device captures a picture of the user when connecting the mobile computing device to the communication system. The camera activates upon connection to the communication system. The camera of the mobile computing device takes a picture of the user. The communication system then stores the picture of the user. The communication system stores the tracking data, the picture and the time and location at detecting the mobile computing device and the user. The tracking data can be stored in a database, storage on a server, or on the mobile computing device.

Figure 11:
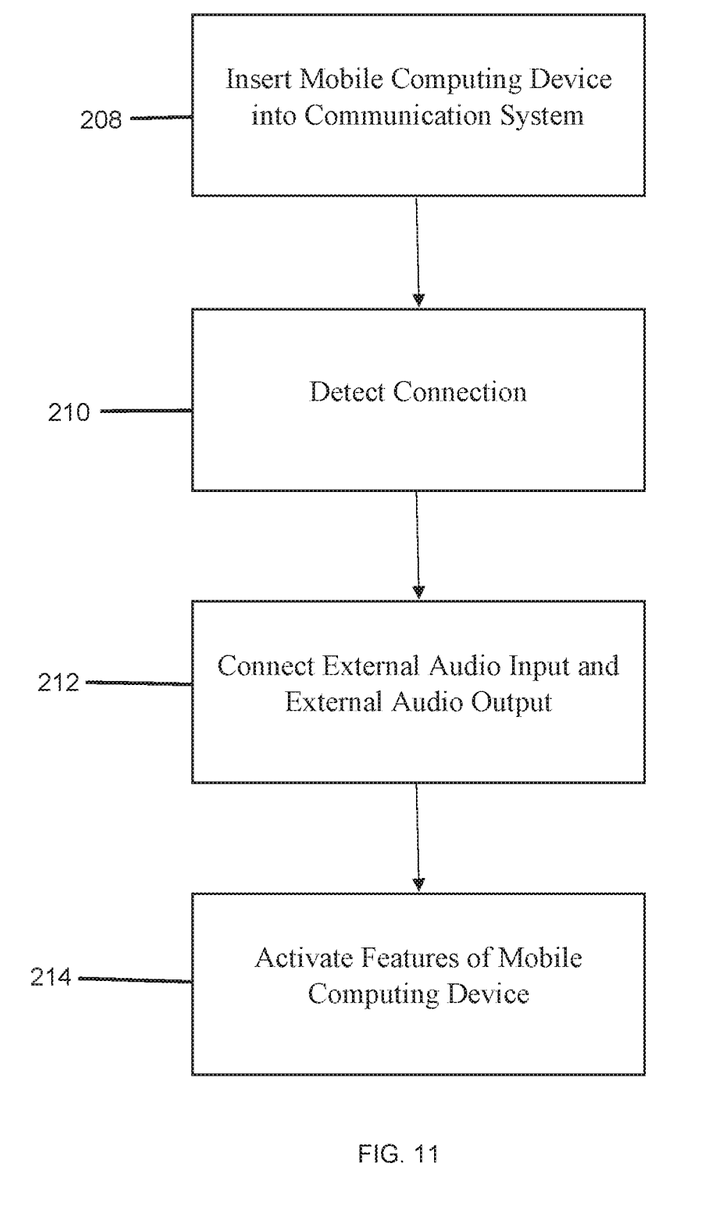
FIG. 11 is a flowchart showing an activation process of one embodiment of the present invention.

FIG. 11 shows the process of activating features of the mobile computing device upon connecting the mobile computing device to the communication system. In one embodiment, the mobile computing device inserts into the housing to connect the mobile commuting device to the communication system at Step 208.

The mobile computing device may connect to the communication system wirelessly or through a wired connection. The communication system detects connection of the mobile computing device with the communication system at Step 210. The communication system connects the external audio input and the external audio input with the mobile computing device.

As discussed above, the connection of the mobile computing device to the communication system may be wired or wireless. In the wired connection, the plug inserts into the mobile computing device. The mobile computing device detects the connection to allow the system to know that the mobile computing device is connected to the communication system.

The mobile computing device may also connect wirelessly to the mobile computing device. In such an embodiment, the mobile computing device detects a GPS location that confirms that the mobile computing device is within the housing. In another embodiment, the camera of the mobile computing device may capture an image of a location identifier. Capturing the location identifier confirms that the mobile computing device is installed within the housing.

The mobile computing device then connects to the external audio input and the external audio output at Step 212. The mobile computing device plays audio through the external audio output. The mobile computing device also receives audio captured by the audio input.

The mobile computing device may then activate additional features of the mobile computing device when installed with the housing at Step 214. Such features that are activated may include but are not limited to the camera, video conferencing, phone conferencing, use of restricted or otherwise limited use applications, use of social media, access to restricted or otherwise limited use websites, etc. In such an embodiment, insertion of the mobile computing device into the housing enables software applications and features that were restricted for the user prior to insertion into the housing. The user may then use the software applications and features that were previously restricted upon insertion of the mobile computing device into the housing.

The communication system may also be implemented as a charging station. A charging system may be installed within the housing for charging the mobile computing device. The charging system may charge the phone through a wired connection or wirelessly. The charging system charges the mobile computing device upon insertion of the mobile computing device into the housing. In another embodiment, the charging system charges the mobile computing device upon full insertion of the mobile computing device into the housing.

In the wired connection, a plug may be installed within the housing. The plug inserts into a charging port of the mobile computing device. In another embodiment, the mobile computing device may allow for audio inputs and audio outputs to be plugged into a charging port. In such an embodiment, a single plug can allow for charging and use of the audio input and audio output.

In another embodiment, the charging system wirelessly charges the mobile computing device. The housing provides a wireless charging system that charges the mobile computing device when the mobile computing device is inserted into the housing. Such a wireless charging system may be an inductive charging system, infrared, infrared laser, solar, ultrasound, ultrasonic, or other wireless charging system.

The housing has been described as attaching to the wall of the facility. The housing may be installed on other surfaces. The housing may also be installed on a table, within furniture, or on other equipment.

The communication system of the present invention installs within a prison, jail, juvenile detention center, or other correctional facility. The communication system may also be installed in other locations. The communication system enables video visitation of users within the correctional facility or at the location. The communication system limits video visitation to only those visitations connected to the communication system. The mobile computing devices of the present invention restrict video visitation to specific locations at which the housing(s) is/are located. Such limitation of the camera and video visitation eliminates the camera being used in restricted areas such as the bathrooms, showers, or other off limit areas.

The controlled environment facility, such as the correctional facility, may restrict some software applications and features of the mobile computing device. The facility may require that the software applications and features be available to users at designated locations. In such an embodiment, insertion of the mobile computing device into the housing enables software applications and features that were restricted for the user prior to insertion into the housing. The user may then use the software applications and features that were previously restricted upon insertion of the mobile computing device into the housing.

The communication system connects the mobile computing device to the external audio output and the external audio input. In one embodiment, the mobile computing device is an inmate phone or inmate tablet. The inmate's device connects to the communication system to allow for communication outside of the correctional facility.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A communication system that accepts a mobile computing device to enable private communication through the mobile computing device, the system comprising:
   a housing that accepts the mobile computing device, wherein the housing does not accept an external power source from entering the housing;
   a receiving aperture within the housing, the receiving aperture sized to accept the mobile computing device;
   an audio data transmission system in communication with the housing wherein the insertion of the mobile computing device into the housing connects the computing device with the audio data transmission;
   a personal speaker external of the mobile computing device, the personal speaker connected to the audio data transmission system wherein the speaker receives a signal through the audio data transmission system;
   an audio input external of the mobile computing device, the audio input connected to the audio data transmission system wherein the audio input transmits a signal through the audio data transmission system;
   a plug of the audio data transmission system located within the receiving aperture;
   a conductor connected to the plug wherein the conductor connects the audio input and the personal speaker to the plug wherein the plug inserted into the mobile computing device powers the personal speaker, the plug directly connecting the mobile computing device with the personal speaker, wherein the plug does not connect to a power source outside of the housing.

2. The system of claim 1 further comprising:
   a lock wherein the lock secures the housing to prevent removal of the conductor from the housing.

3. A communication system that accepts a mobile computing device to enable private communication through the mobile computing device, the system comprising:
   a housing that accepts the mobile computing device, wherein the housing does not accept an external power source within the housing;
   a receiving aperture within the housing, the receiving aperture sized to accept the mobile computing device wherein the housing secures the computing device within the receiving aperture;
   an audio data transmission system in communication with the housing wherein the insertion of the mobile computing device into the housing connects the computing device with the audio data transmission wherein the mobile computing device detects connection of the mobile computing device with the audio data transmission;
   a personal speaker external of the mobile computing device, the personal speaker connected to the audio data transmission system wherein the speaker receives a signal through the audio data transmission system wherein the personal speaker connects directly with the mobile computing device, wherein the personal speaker does not connect to a power source outside of the housing.

4. The system of claim 3 further comprising:
   an audio input external of the mobile computing device, the audio input connected to the audio data transmission system wherein the audio input transmits a signal through the audio data transmission system.

5. The system of claim 3 wherein the personal speaker plays audio received through the audio data transmission system personally to the user.

6. The system of claim 4 wherein the audio input transmits audio captured by the audio input through the audio data transmission system to the mobile computing device.

7. The system of claim 3 further comprising:
a first guide finger that extends partially across the receiving aperture wherein the receiving aperture is located between the housing and the first guide finger, the first guide finger defining the receiving aperture; and
a second guide finger that extends partially across the receiving aperture wherein the receiving aperture is located between the housing and the second guide finger, the second guide finger defining the receiving aperture.

8. The system of claim 3 further comprising:
a plug oriented for insertion into the mobile computing device, the plug directed towards an opening of the receiving aperture wherein the mobile computing device inserts into the opening of the receiving aperture when inserting the mobile computing device into the housing, wherein the plug does not connect to the power source outside of the housing, wherein the plug directly connects the mobile computing device with the personal speaker wherein the plug plugged into the mobile computing device powers the personal speaker.

9. A communication system that accepts a mobile computing device to enable private communication through the mobile computing device, the system comprising:
a housing that accepts the mobile computing device;
a receiving aperture within the housing, the receiving aperture defining a longitudinal axis wherein the receiving aperture accepts insertion of the mobile computing device longitudinally into the receiving aperture;
a plug located within the receiving aperture wherein the plug is directed longitudinally for insertion, wherein the plug does not connect to an external power source;
a personal speaker external of the mobile computing device, the personal speaker connected to the plug wherein the speaker receives an audio signal from the plug, the personal speaker playing audio received through the plug personally to the user, wherein the plug inserted into the mobile computing device powers the personal speaker, wherein the plug directly connects the mobile computing device with the personal speaker.

10. The system of claim 9 further comprising:
an audio input external of the mobile computing device, the audio input connected to the plug wherein the audio input transmits an audio signal through the plug, the audio input transmitting audio captured by the audio input through the plug, wherein the plug inserted into the mobile computing device powers the audio input.

11. The system of claim 9 further comprising:
a first guide finger that extends partially across the receiving aperture wherein the receiving aperture is located between the housing and the first guide finger, the first guide finger defining the receiving aperture;
a second guide finger that extends partially across the receiving aperture wherein the receiving aperture is located between the housing and the second guide finger, the second guide finger defining the receiving aperture; and
the first guide finger and the second guide finger defining an opening extending laterally outward from the receiving aperture.

12. The system of claim 11 wherein the first guide finger and the second guide finger extend along the longitudinal axis to narrow the opening of the receiving aperture.

13. A communication system that accepts a mobile computing device to enable private communication through the mobile computing device, the system comprising:
a housing that accepts the mobile computing device, wherein the housing does not accept an external power source from entering the housing;
a receiving aperture within the housing, the receiving aperture sized to accept the mobile computing device;
an audio data transmission system in communication with the housing wherein the insertion of the mobile computing device into the housing connects the computing device with the audio data transmission;
a personal speaker external of the mobile computing device, the personal speaker connected to the audio data transmission system wherein the speaker receives a signal through the audio data transmission system;
a charging system that charges the mobile electronic device when the mobile electronic device is fully inserted into the housing.

14. A communication system that accepts a mobile computing device to enable private communication through the mobile computing device, the system comprising:
a housing that accepts the mobile computing device, wherein the housing does not accept an external power source from entering the housing;
a receiving aperture within the housing, the receiving aperture sized to accept the mobile computing device;
an audio data transmission system in communication with the housing wherein the insertion of the mobile computing device into the housing connects the computing device with the audio data transmission;
a personal speaker external of the mobile computing device, the personal speaker connected to the audio data transmission system wherein the speaker receives a signal through the audio data transmission system;
wherein the mobile computing device detects insertion of the mobile computing device into the housing.

15. The system of claim 14 wherein insertion of the mobile computing device into the housing enables software features restricted prior to insertion of mobile computing device into the housing.

16. A communication system that accepts a mobile computing device to enable private communication through the mobile computing device, the system comprising:
a housing that accepts the mobile computing device;
a receiving aperture within the housing, the receiving aperture sized to accept the mobile computing device;
an audio data transmission system in communication with the housing wherein the insertion of the mobile computing device into the housing connects the computing device with the audio data transmission;
a personal speaker external of the mobile computing device, the personal speaker connected to the audio data transmission system wherein the speaker receives a signal through the audio data transmission system;
wherein the mobile computing device detects insertion of the mobile computing device into the housing;
a camera that is disabled for use prior to insertion into the housing wherein insertion of the mobile computing device into the housing enables the camera for usage.

17. A communication system that accepts a mobile computing device to enable private communication through the mobile computing device, the system comprising:
a housing that accepts the mobile computing device;

a receiving aperture within the housing, the receiving aperture sized to accept the mobile computing device;

an audio data transmission system in communication with the housing wherein the insertion of the mobile computing device into the housing connects the computing device with the audio data transmission;

a personal speaker external of the mobile computing device, the personal speaker connected to the audio data transmission system wherein the speaker receives a signal through the audio data transmission system;

wherein the mobile computing device detects insertion of the mobile computing device into the housing;

wherein the communication system records a date and time that the mobile computing device is inserted into the housing.

18. The system of claim 17 wherein the communication system displays a report identifying which mobile computing devices were inserted into the housing and the date and time that the mobile computing device is inserted into the housing.

* * * * *